United States Patent
Yun et al.

(10) Patent No.: US 10,890,501 B2
(45) Date of Patent: Jan. 12, 2021

(54) ADDITIVE MANUFACTURING INTEGRATED INSTRUMENTATION DESIGN FOR IMPROVED STATIC PRESSURE MEASUREMENTS

(71) Applicant: Hamilton Sundstrand Corporation, Charlotte, NC (US)

(72) Inventors: Thomas M. Yun, Glastonbury, CT (US); Robert H. Dold, Monson, MA (US); John H. Whiton, South Windsor, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 160 days.

(21) Appl. No.: 16/165,591

(22) Filed: Oct. 19, 2018

(65) Prior Publication Data

US 2020/0124490 A1    Apr. 23, 2020

(51) Int. Cl.
    *G01L 19/00* (2006.01)
    *G01F 1/46* (2006.01)
    *B33Y 80/00* (2015.01)

(52) U.S. Cl.
    CPC .......... *G01L 19/0038* (2013.01); *B33Y 80/00* (2014.12); *G01F 1/46* (2013.01)

(58) Field of Classification Search
    USPC .......................................... 73/700–756, 861
    See application file for complete search history.

(56) References Cited

U.S. PATENT DOCUMENTS

| | | |
|---|---|---|
| 3,950,995 A | 4/1976 | Marshall |
| 9,027,392 B2 | 5/2015 | Vander Hoek |
| 9,664,542 B2 | 5/2017 | Gordon et al. |
| 2006/0060001 A1* | 3/2006 | Kurtz ................ G01F 1/46 73/861.65 |
| 2010/0305881 A1* | 12/2010 | Atkinson ............ G01F 1/74 702/47 |
| 2013/0008264 A1* | 1/2013 | McDaniel ........... G05D 7/0635 73/861.65 |
| 2016/0258792 A1 | 9/2016 | Potter |
| 2016/0280391 A1 | 9/2016 | Golly et al. |
| 2016/0348531 A1 | 12/2016 | Rice et al. |
| 2019/0204196 A1* | 7/2019 | Greist ................ G01N 7/10 |

FOREIGN PATENT DOCUMENTS

| | | |
|---|---|---|
| EP | 3540399 A1 | 9/2019 |
| GB | 1134101 A | 11/1968 |

OTHER PUBLICATIONS

Extended European Search Report for EP Application No. 19204026.9 dated Mar. 16, 2020, pp. 1-13.

* cited by examiner

*Primary Examiner* — Andre J Allen
(74) *Attorney, Agent, or Firm* — Cantor Colburn LLP

(57) ABSTRACT

A product for pressure measurements is provided. The product being integral to a component comprising a conduit encasing a flow path of a medium. The product includes static pressure holes, located on the conduit, that access the flow path and the medium. The product includes a static port, which provides a volume that includes an average static pressure across the static pressure holes. The product includes channels, each which directly corresponds to and fluidly couples each static pressure hole to the static port.

16 Claims, 3 Drawing Sheets

ADDITIVE MANUFACTURING INTEGRATED INSTRUMENTATION DESIGN FOR IMPROVED STATIC PRESSURE MEASUREMENTS

BACKGROUND

Static pressure in a fluid flow is commonly measured through a surface tap formed by a circular hole (in a pipe) that is parallel with the fluid flow. Further, when uneven pressure distribution around a flow cross section is present, multiple taps can be implemented around a periphery (of the pipe) and an average static pressure can be measured individually or collectively from those multiple taps. For instance, a conventional piezometer ring can be used to get the average static pressure around a circumference of the flow cross section with the pipe. Yet, current surface tap instrumentation has limitations due a complexity of average pressure measurements and/or accessibility to locations (some of which may otherwise be unobtainable).

BRIEF DESCRIPTION

In accordance with one or more embodiments, a product is provided. The product being integral to a component including a conduit encasing a flow path of a medium. The product includes static pressure holes, located on the conduit, that access the flow path and the medium. The product includes a static port, which provides a volume that includes an average static pressure across the static pressure holes. The product includes channels, each which directly corresponds to and fluidly couples each static pressure hole to the static port.

In accordance with one or more embodiments or the product embodiment above, the product can include one or more second static pressure holes located on the conduit and accessing the flow path and the medium; a second static port providing a second volume including an average static pressure across the one or more second static pressure holes; and one or more second channels, each second channel of the one or more second channels directly corresponding to and fluidly coupling each second static pressure hole of the one or more static pressure holes to the second static port.

In accordance with one or more embodiments or any of the product embodiments above, the static port can be located on a first side of the conduit and the second static port can be located on a side of the conduit opposite to the first side.

In accordance with one or more embodiments or any of the product embodiments above, the product can be formed contemporaneously with the component as an additive manufactured apparatus.

In accordance with one or more embodiments or any of the product embodiments above, the static port can include a pressure sensor that detects the average static pressure as one of the pressure measurements and that is communicatively coupled to an external system.

In accordance with one or more embodiments or any of the product embodiments above, the one or more static pressure holes can include four static pressure holes, and the one or more channels can include four channels directly corresponding to and fluidly coupling each static pressure hole of the four static pressure holes.

In accordance with one or more embodiments or any of the product embodiments above, the component can include a plenum.

In accordance with one or more embodiments or any of the product embodiments above, the component can include a heat exchanger.

In accordance with one or more embodiments, an additive manufactured apparatus is provided. The additive manufactured product includes a component including a conduit encasing a flow path of a medium and a pressure measurement product integral to the component. The pressure measurement product includes a first static port providing a first volume, a first set of first static pressure holes located on the conduit and accessing the flow path and the medium, and a first set of first channels. Each first channel directly corresponding to and fluidly coupling each first hole of the first set of first static pressure holes to the first static port.

In accordance with one or more embodiments or the additive manufactured apparatus embodiment above, the pressure measurement product can include a second static port providing a second volume, a second set of second static pressure holes located on the conduit and accessing the flow path and the medium, and a second set of second channels. Each second channel directly corresponds to and fluidly couples each second hole of the second set of second static pressure holes to the second static port.

In accordance with one or more embodiments or any of the additive manufactured apparatus embodiments above, the first static port can be located on a first side of the conduit and the second static port can be located on a side of the conduit opposite to the first side.

In accordance with one or more embodiments or any of the additive manufactured apparatus embodiments above, the conduit can include a plenum.

In accordance with one or more embodiments or any of the additive manufactured apparatus embodiments above, the additive manufactured product can include a heat exchanger.

In accordance with one or more embodiments or any of the additive manufactured product embodiments above, the conduit can be one of a set of conduits encasing multiple flow paths for the medium.

In accordance with one or more embodiments or any of the additive manufactured product embodiments above, each static pressure hole of the first and second static pressure holes can directly correspond to and be located on a particular conduit of the set of conduits.

In accordance with one or more embodiments or any of the additive manufactured product embodiments above, the first and second static ports include pressure sensors that can detect the average static pressure as one of the pressure measurements and that can be communicatively coupled to an external system.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
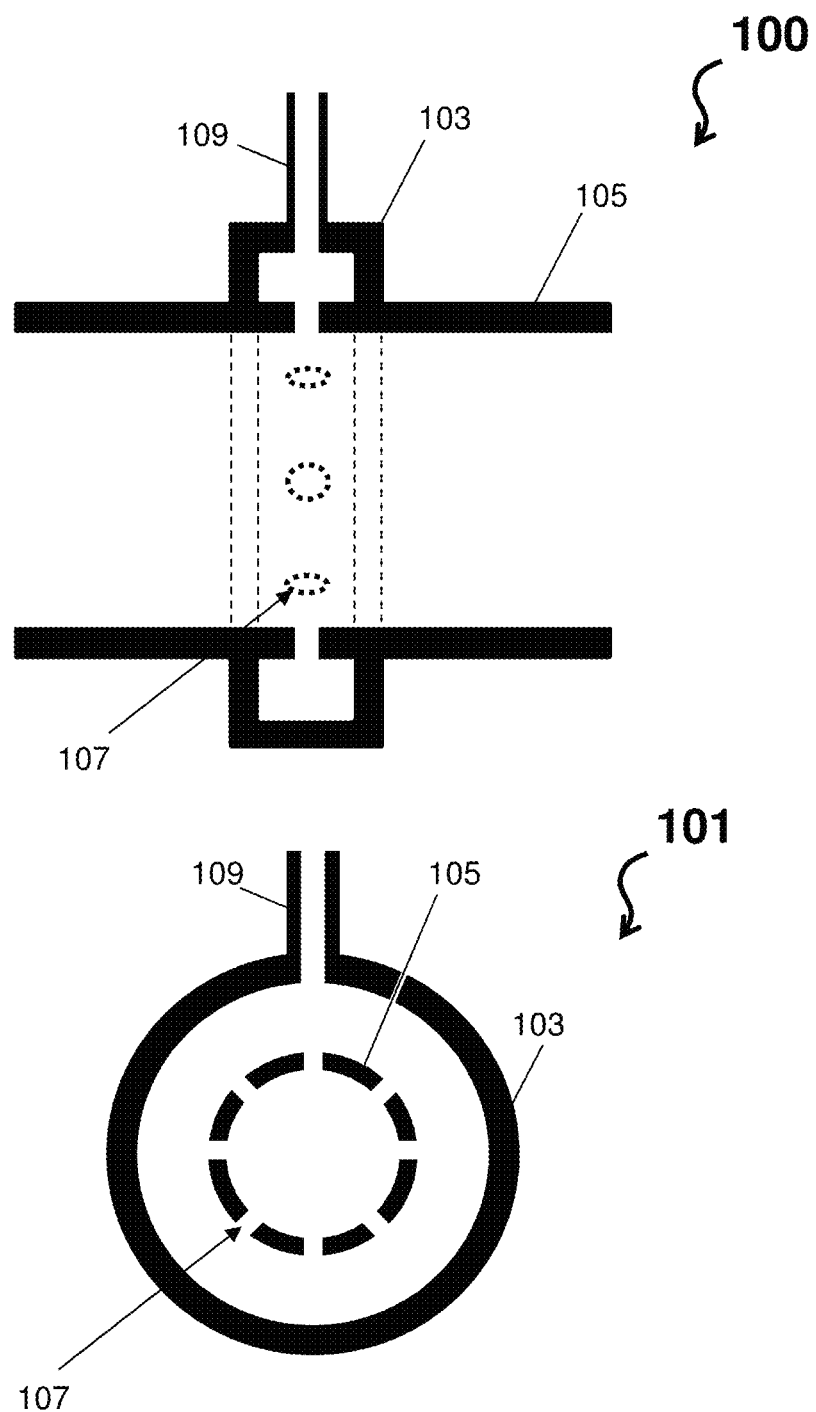
FIG. 1 depicts a piezometer ring that averages static pressure around circumference.

Turning now to an overview of technologies that are more specifically relevant to aspects of the invention, as discussed above, current surface tap instrumentation has limitations due to a complexity of average pressure measurements and/or accessibility to locations (some of which may otherwise be unobtainable). For example, FIG. 1 depicts as background art a first cross-sectional view 100 and a second cross-sectional view 101 of a piezometer ring 103 that averages static pressure around a circumference of a pipe. The piezometer ring 103 is attached to an exterior of the pipe 105 and accesses a fluid therein via multiple taps 107 around a periphery of the pipe 105. An average static pressure can be measured individually or collectively from those multiple taps 107 at a surface tap 109. Additional concerns of utilizing the piezometer ring 103 include risks of part damage from drilling the multiple taps 107 and risks of connection/contact point leaks between the piezometer ring 103 and the pipe 105. Further, the piezometer ring 103 is simply unable to be installed internally to devices and components, such as heat exchangers.

Turning now to an overview of the aspects of the invention, one or more embodiments of the invention address the above-described shortcomings of the background art by providing a product, an apparatus, and/or a system (referred to as a product, herein, for brevity). In general, the product is formed contemporaneously with and integral to a component via additive manufacturing. Additive manufacturing is a three-dimensional object production process utilizing computer design file. In this regard, a variety of materials ranging from polymer composites, metals, ceramics, food, foams, gels, etc. are deposited by a tool or feeder according to the computer design file and heated by an electric beam to set the material in place. The location of the deposited materials as the tool or feeder moves according to the computer design file is referred to as a tool path.

The product described herein includes one or more static pressure holes fluidly coupled by one or more channels to a static port. For example, the one or more static pressure holes are located on a conduit of the component, which encases a flow path of a medium. The one or more static pressure holes provide access to the flow path and the medium and enable a portion of the medium to flow into the one or more channels and the static port. The static port provides a volume at an average static pressure across the one or more static pressure holes. The static port can receive and include a pressure sensor that detects the average static pressure as a pressure measurement and that is communicatively coupled to an external system (to provide the pressure measurement).

Technical effects and benefits of embodiments herein include more accurate average static pressure measurement of the flow path and medium, capturing pressure at more locations with respect to the conduit, an increased accessibility to complex internal passages. Further, where a plurality of static ports exists, the product provides convenience in measuring a flow distribution by comparing measurements from different segments of the component and enables the static ports to be inserted at different desired locations for convenience in measurement. Technical effects and benefits of embodiments herein also include integrating instrumentation features to the component, simplifying a number of instrumentation parts, reducing in costs for testing, reducing connection points to lower possibility of leaks, and eliminating risks of part damage from drilling pressure taps and attaching external pressure port bosses.

Figure 2:
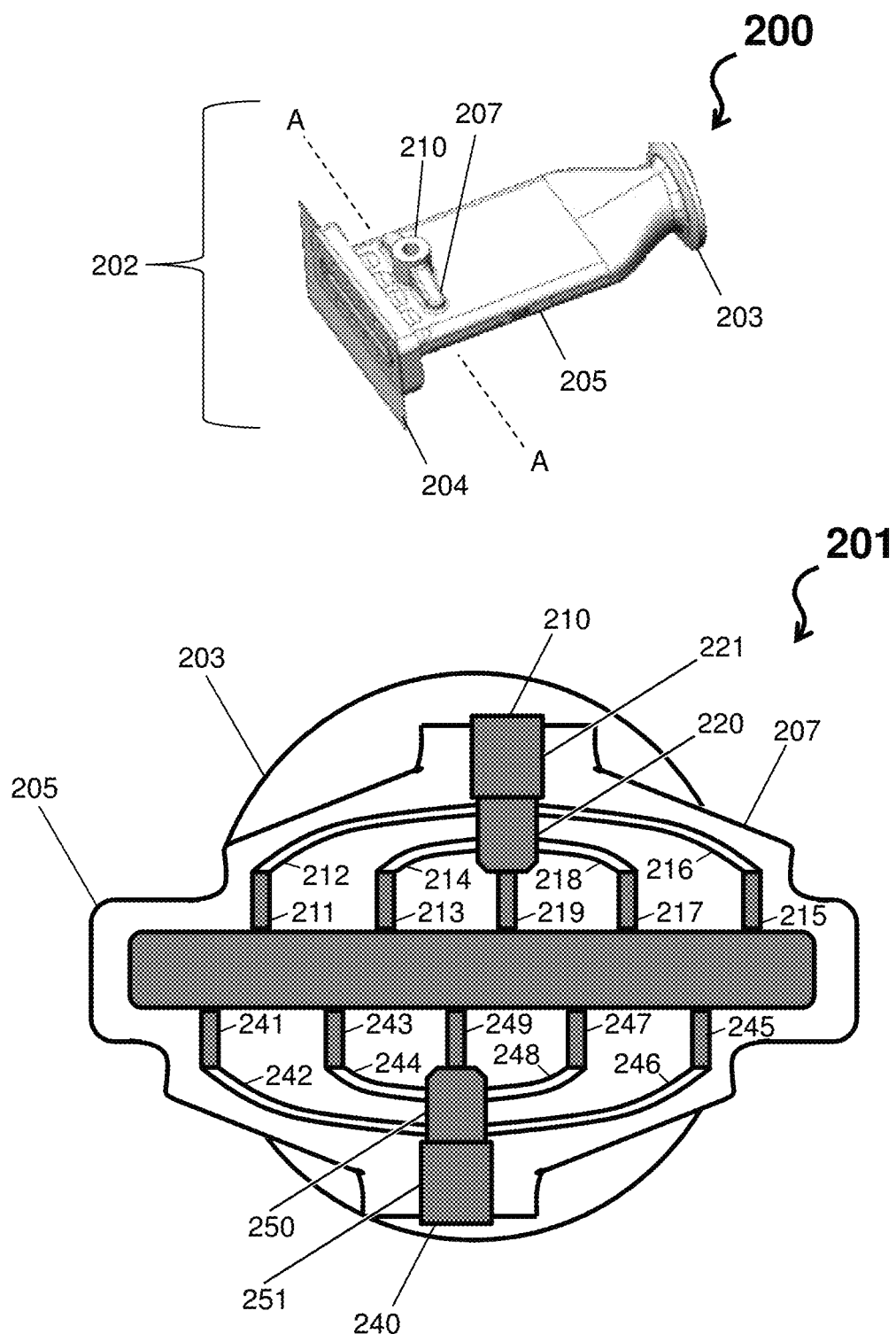
FIG. 2 depicts an apparatus formed by additive manufacturing according to one or more embodiments.

FIG. 2 depicts a perspective view 200 and a cross-sectional view 201 of an apparatus 202 formed by additive manufacturing according to one or more embodiments. The apparatus 202 includes a first end 203, a second end 204, and a conduit 205, which may be collectively referred to as a component. The component can be a plenum or a duct that provides a medium from the first end 203 to the second end 204 or vice versa. The apparatus 202 includes a product 207 for pressure measurements of the conduit 205.

As shown in the perspective view 200, the product 207 comprises a static port 210 that can receive and include a pressure sensor that detects the average static pressure as a pressure measurement (average or local pressure measurements) and that is communicatively coupled to an external system (to provide the pressure measurement). The static port 210 can be placed on external surface of the conduit 204. The perspective view 200 depicts a line A-A from which the cross-sectional view 201 is taken.

As shown in the cross-sectional view 201, the product can includes one or more static pressure holes that directly correspond to and fluidly couple (e.g., internally connect) each static pressure hole to the static port 210. For example, a static pressure hole 211 corresponds to a channel 212 that fluidly couples the static pressure hole 211 to the static port 210. Further, a static pressure hole 213 corresponds to a channel 214 that fluidly couples the static pressure hole 213 to the static port 210, a static pressure hole 215 corresponds to a channel 216 that fluidly couples the static pressure hole 215 to the static port 210, and a static pressure hole 217 corresponds to a channel 218 that fluidly couples the static pressure hole 217 to the static port 210. Thus, four channels 212, 214, 216, and 218 directly correspond to and fluidly couple the four static pressure holes 211, 213, 215, and 217 to the static port 210, thereby providing internal pressure passages that can be designed in the desired locations for measurement.

According to one or more embodiments, the static pressure hole 219 is directly coupled to the static port 210, given the proximity and location of the static port 210. According to one or more embodiments, the static port 210 can include a collection area 220 that collects the medium from each of the channels 212, 214, 216, and 218 and the static pressure hole 219 before the collected medium is provided to a sensor receiving portion 221 (in which the pressure sensor is located).

In an optional embodiment, the product 207 can include one or more second static pressure holes that directly correspond to one or more second channels that fluidly couple (e.g., internally connect) each static pressure hole to the static port 240. In this regard, the static port 210 is located on a first side of the conduit 205 and the static port 240 is located on a side of the conduit 205 opposite to the first side. For example, a static pressure hole 241 corresponds to a channel 242 that fluidly couples the static pressure hole 241 to the static port 240. Further, a static pressure hole 243 corresponds to a channel 244 that fluidly couples the static pressure hole 243 to the static port 210, a static pressure hole 245 corresponds to a channel 246 that fluidly couples the static pressure hole 245 to the static port 240, and a static pressure hole 247 corresponds to a channel 248 that fluidly couples the static pressure hole 247 to the static port 240. Thus, four channels 242, 244, 246, and 248 directly correspond to and fluidly couple the four static pressure holes 241, 243, 245, and 247 to the static port 240, thereby providing internal pressure passages that can be designed in the desired locations for measurement.

According to one or more embodiments, the static pressure hole 249 can be directly coupled to the static port 240, given the proximity and location of the static port 240.

According to one or more embodiments, the static port 240 can include a collection area 240 that collects the medium from each of the channels 242, 244, 246, and 248 and the static pressure hole 249 before the collected medium is provided to a sensor receiving portion 241 (in which a second pressure sensor is located).

Note that because the apparatus 202 is formed by additive manufacturing (i.e., the product 205 is formed contemporaneously with the component) there is no risk of damage to the conduit 205 from drilling the static pressure hole 211, 213, 215, 217, 218, 241, 243, 245, 247, and 259, as these portions are integral to the apparatus and no drilling is required. Further, because the apparatus 202 is formed by additive manufacturing there is minimal risk of connection/ contact point leaks between the product 207 and the conduit 205. Thus, by taking advantages of additive manufacturing, internal tap passages can be integrated with flow components to achieve improved average pressure measurement or accessibility to location otherwise unobtainable.

Figure 3:
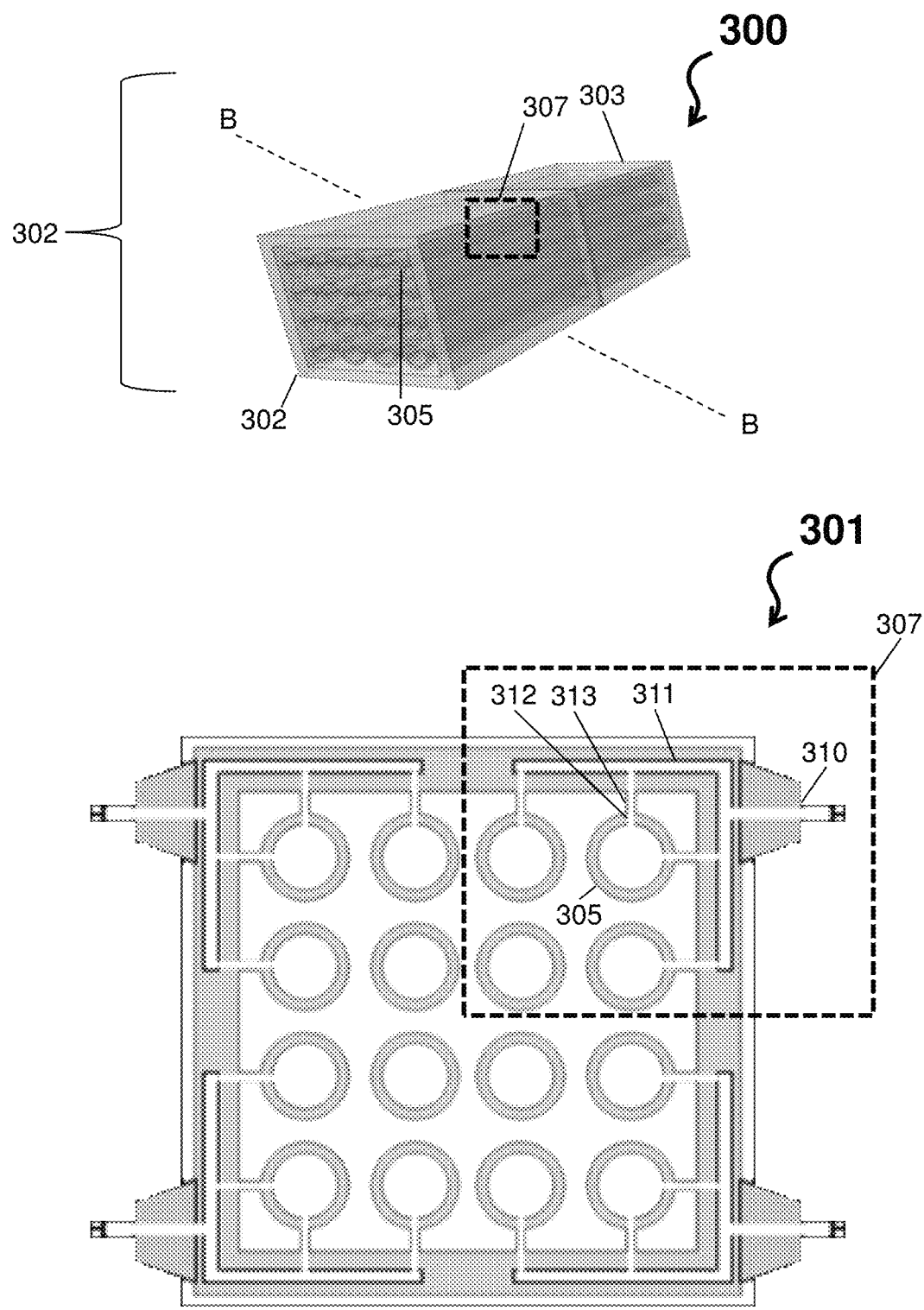
FIG. 3 depicts an apparatus formed by additive manufacturing according to one or more embodiments.

FIG. 3 depicts a perspective view 300 and a cross-sectional view 301 of an apparatus 302 formed by additive manufacturing according to one or more embodiments. The apparatus 302 includes a first end 303, a second end 304, and at least one conduit 305, which may be collectively referred to as a component. The component can be a heat exchanger, such as a tube heat exchanger. The component provides a medium from the first end 303 to the second end 304 or vice versa within each of the at least one conduit 305, while also supporting a flow of a second medium across an exterior of the at least one conduit to provide a heat exchange between the mediums. The second medium can enter and leave the apparatus 302 from any point or location, as needed. The apparatus 302 includes a product 307 for pressure measurements of the at least one conduit 305 (e.g., the product 307 includes a plurality of interconnected passages for a grouped segment, on a same plane, for flow distribution evaluation). The perspective view 300 depicts a line B-B from which the cross-sectional view 301 is taken.

As shown in the cross-sectional view 301, the product 307 comprises a static port 310 that can receive and include a pressure sensor that detects the average static pressure as a pressure measurement (average or local pressure measurements) and that is communicatively coupled to an external system (to provide the pressure measurement). The static port 310 can be placed on external surface of the apparatus 302. Note that, in this embodiment, the product 307 can be connected three conduits that combine to form a set of conduits, each of which encasing a flow path for the medium. The connection of the static port 310 can be duplicated for each of the three conduits. For instance, a collection channel 311 can be connected to a static pressure hole 312 via a sub-channel 313. Further, the product 307 can be duplicated in each corner of the apparatus 302.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A product for pressure measurements, the product being integral to a component comprising a conduit encasing a flow path of a medium, the product comprising:
   one or more static pressure holes located on the conduit and accessing the flow path and medium;
   a static port providing a volume comprising an average static pressure across the one or more static pressure holes; and
   one or more channels, each channel of the one or more channels directly corresponding to and fluidly coupling each static pressure hole of the one or more static pressure holes to the static port.

2. The product of claim 1, the product comprising:
   one or more second static pressure holes located on the conduit and accessing the flow path and the medium;
   a second static port providing a second volume comprising an average static pressure across the one or more second static pressure holes; and
   one or more second channels, each second channel of the one or more second channels directly corresponding to and fluidly coupling each second static pressure hole of the one or more static pressure holes to the second static port.

3. The product of claim 2, wherein the static port is located on a first side of the conduit and the second static port is located on a side of the conduit opposite to the first side.

4. The product of claim 1, wherein the product is formed contemporaneously with the component as an additive manufactured apparatus.

5. The product of claim 1, wherein the static port comprises a pressure sensor that detects the average static pressure as one of the pressure measurements and that is communicatively coupled to an external system.

6. The product of claim 1, wherein the one or more static pressure holes comprises four static pressure holes, and
   wherein the one or more channels comprises four channels directly corresponding to and fluidly coupling each static pressure hole of the four static pressure holes.

7. The product of claim 1, wherein the component comprises a plenum.

8. The product of claim 1, wherein the component comprises a heat exchanger.

9. An additive manufactured apparatus comprising:
   a component comprising a conduit encasing a flow path of a medium;
   a pressure measurement product integral to the component, the pressure measurement product comprising:

a first set of first static pressure holes located on the conduit and accessing the flow path and the medium;

a first static port providing a first volume comprising an average static pressure across the first set of first static pressure holes; and a first set of first channels, each first channel directly corresponding to and fluidly coupling each first hole of the first set of first static pressure holes to the first static port.

10. The additive manufactured apparatus of claim 9, wherein the pressure measurement product comprises:

a second static port providing a second volume;

a second set of second static pressure holes located on the conduit and accessing the flow path and the medium; and a second set of second channels, each second channel directly corresponding to and fluidly coupling each second hole of the second set of second static pressure holes to the second static port.

11. The additive manufactured apparatus of claim 9, wherein the first static port is located on a first side of the conduit and the second static port is located on a side of the conduit opposite to the first side.

12. The additive manufactured apparatus of claim 9, wherein the conduit comprises a plenum.

13. The additive manufactured apparatus of claim 9, wherein the additive manufactured product comprises a heat exchanger.

14. The additive manufactured apparatus of claim 13, wherein the conduit is one of a set of conduits encasing multiple flow paths for the medium.

15. The additive manufactured product of claim 14, wherein each static pressure hole of the first and second static pressure holes directly corresponds to and are located on a particular conduit of the set of conduits.

16. The additive manufactured apparatus of claim 9, wherein the first and second static ports comprise pressure sensors that detect the average static pressure as one of the pressure measurements and that are communicatively coupled to an external system.

\* \* \* \* \*